United States Patent
Hiasa

(10) Patent No.: US 12,211,184 B2
(45) Date of Patent: Jan. 28, 2025

(54) IMAGE PROCESSING METHOD, IMAGE PROCESSING APPARATUS AND IMAGE PROCESSING SYSTEM THAT SUPPRESSES A SIDE EFFECT THAT OCCURS WHEN AN IMAGE IS ESTIMATED BASED ON A CAPTURED IMAGE BY USING A MACHINE LEARNING MODEL

(71) Applicant: CANON KABUSHIKI KAISHA, Tokyo (JP)

(72) Inventor: Norihito Hiasa, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 227 days.

(21) Appl. No.: 17/223,985

(22) Filed: Apr. 6, 2021

(65) Prior Publication Data

US 2021/0319537 A1   Oct. 14, 2021

(30) Foreign Application Priority Data

Apr. 10, 2020   (JP) .................................. 2020-071279

(51) Int. Cl.
*G06T 5/73* (2024.01)
*G06N 3/045* (2023.01)
(Continued)

(52) U.S. Cl.
CPC ............... *G06T 5/73* (2024.01); *G06N 3/045* (2023.01); *G06N 3/08* (2013.01); *G06T 7/70* (2017.01);
(Continued)

(58) Field of Classification Search
CPC . G06T 5/003; G06T 7/70; G06T 2207/20081; G06V 10/82; G06V 10/70;
(Continued)

(56) References Cited

U.S. PATENT DOCUMENTS 9,912,839 B2 * 3/2018 Kervec ................ H04N 1/6027
10,511,825 B2 * 12/2019 Presler .................. G03B 17/56
(Continued)

FOREIGN PATENT DOCUMENTS

JP   2018048979 A     3/2018
JP   2020020744 A *   2/2020 ............. G01N 21/88

OTHER PUBLICATIONS

Xu, Xiangyu, et al. "Motion blur kernel estimation via deep learning." IEEE Transactions on Image Processing 27.1 (2017): 194-205.) (Year: 2017).*
(Continued)

*Primary Examiner* — Vincent Rudolph
*Assistant Examiner* — Meredith Taylor
(74) *Attorney, Agent, or Firm* — Canon U.S.A., Inc. IP Division

(57) ABSTRACT

An image processing method includes steps of acquiring first model output generated based on a captured image by a first machine learning model, acquiring second model output generated based on the captured image by a second machine learning model which is different from the first machine learning model, and generating an estimated image by using the first model output and the second model output, based on a comparison based on the second model output and one of the captured image and first model output.

2 Claims, 15 Drawing Sheets

(51) Int. Cl.
*G06N 3/08* (2023.01)
*G06T 7/70* (2017.01)
*G06V 10/75* (2022.01)
*G06V 10/764* (2022.01)
*G06V 10/82* (2022.01)

(52) U.S. Cl.
CPC .......... *G06V 10/751* (2022.01); *G06V 10/764* (2022.01); *G06V 10/82* (2022.01)

(58) Field of Classification Search
CPC .... G06V 10/751; G06V 10/764; G06N 3/045; G06N 3/04; G06N 3/08; G06N 3/084; G06F 18/213
See application file for complete search history.

(56) References Cited

U.S. PATENT DOCUMENTS

| | | | | |
|---|---|---|---|---|
| 2015/0131898 A1* | 5/2015 | Schelten | ................... | G06T 5/73 382/159 |
| 2018/0150726 A1* | 5/2018 | Gorban | ............... | G06F 18/2148 |
| 2020/0273176 A1* | 8/2020 | Takeda | .................... | G06T 7/194 |
| 2020/0342586 A1* | 10/2020 | Kumar | ...................... | G06T 7/13 |
| 2021/0073953 A1* | 3/2021 | Lee | ......................... | G06T 7/571 |

OTHER PUBLICATIONS

Schuler, Christian J., et al. "Learning to deblur." IEEE transactions on pattern analysis and machine intelligence 38.7 (2015): 1439-1451. (Year: 2015).*

Harmeling, Stefan, et al. "Multiframe blind deconvolution, super-resolution, and saturation correction via incremental EM." 2010 IEEE International Conference on Image Processing. IEEE, 2010. (Year: 2010).*

Li Xu, et al., Deep Convolutional Neural Network for Image Deconvolution, Advances in Neural Information Processing Systems 27, NIPS 2014, pp. 1-9.

* cited by examiner

IMAGE PROCESSING METHOD, IMAGE PROCESSING APPARATUS AND IMAGE PROCESSING SYSTEM THAT SUPPRESSES A SIDE EFFECT THAT OCCURS WHEN AN IMAGE IS ESTIMATED BASED ON A CAPTURED IMAGE BY USING A MACHINE LEARNING MODEL

BACKGROUND

Field of the Disclosure

The present disclosure relates to an image processing method that suppresses a side effect that uniquely occurs when an image is estimated based on a captured image by using a machine learning model.

Description of the Related Art

A machine learning model can estimate an image while realizing higher effect than an effect of theory-based estimation on an image using an assumption or an approximation. In the theory-based estimation on an image, the effect is decreased by elements ignored by the assumption or approximation. On the other hand, in the machine learning model, by performing learning by using learning data including those elements, an image can be estimated with high effect based on learning data without making assumption and approximation.

For example, in a technique of deblurring a captured image, the element is a saturated pixel of the captured image. In the theory-based method such as a Wiener filter, it is assumed that the saturated pixel does not exist. Thus, around the saturated pixel, blur is not properly corrected and a side effect such as ringing occurs. On the other hand, Li Xu, et al., Deep Convolutional Neural Network for Image Deconvolution, Advances in Neural Information Processing Systems 27, NIPS 2014 (hereinafter referred to as Li Xu et al.) uses a convolutional neural network (CNN), which is one of the machine learning models, to deblur a captured image. A learning data set is generated by blurring an image having a signal value equal to or higher than a saturation value in the captured image, and the CNN is made to learn the learning data set. Thereby, the image can be deblurred while the side effect is suppressed even in the vicinity of the saturated pixels.

However, the method disclosed in Li Xu, et al. may generate an artifact, that is a false structure, in an object at a position having no relation with the saturated pixel. The artifact is, specifically, a local decrease or increase in a signal value, that is not consistent with the structure of an actual object. The artifact is one of the side effects that uniquely occur when an image is estimated by using the machine learning model. When an image is subjected to estimation other than deblurring, a side effect unique to the machine learning model may occur.

SUMMARY

The present disclosure provides an image processing method, an image processing apparatus, an image processing system, and a memory medium each of which can suppress a side effect that uniquely occurs when an image is estimated by using a machine learning model.

An image processing method according to one aspect of the present disclosure includes steps of acquiring first model output generated based on a captured image by a first machine learning model, acquiring second model output generated based on the captured image by a second machine learning model which is different from the first machine learning model, and generating an estimated image by using the first model output and the second model output, based on a comparison based on the second model output and one of the captured image and first model output.

An image processing apparatus according to one aspect of the present disclosure includes at least one processor or circuit configured to execute a plurality of tasks including an acquisition task configured to acquire first model output generated based on a captured image by a first machine learning model, and to acquire second model output generated based on the captured image by a second machine learning model that is different from the first machine learning model, and a generation task configured to generate an estimated image using the first model output and the second model output, based on a comparison based on the second model output and one of the captured image and first model output.

An image processing system according to another aspect of the present disclosure has a first apparatus and a second apparatus. The first apparatus includes at least one processor or circuit configured to execute a task of a transmitting task configured to transmit a captured image and a request regarding execution of processing, to the second apparatus. The second apparatus includes at least one processor or circuit configured to execute a plurality of tasks of a receiving task configured to receive the captured image and the request, and a first generation task configured to, in response to the request, generate first model output based on the captured image by a first machine learning model, and to generate second model output based on the captured image by a second machine learning model that is different from the first machine learning model. The first apparatus is further configured to execute a task of a second generation task configured to generate an estimated image by using the first model output and the second model output, based on a comparison based on the second model output and one of the captured image and first model output.

A non-transitory computer-readable storage medium storing a computer program that causes a computer to execute the above image processing method also constitute another aspect of the present disclosure.

Further features of the present disclosure will become apparent from the following description of exemplary embodiments with reference to the attached drawings.

DESCRIPTION OF THE EMBODIMENTS

Figure 1:
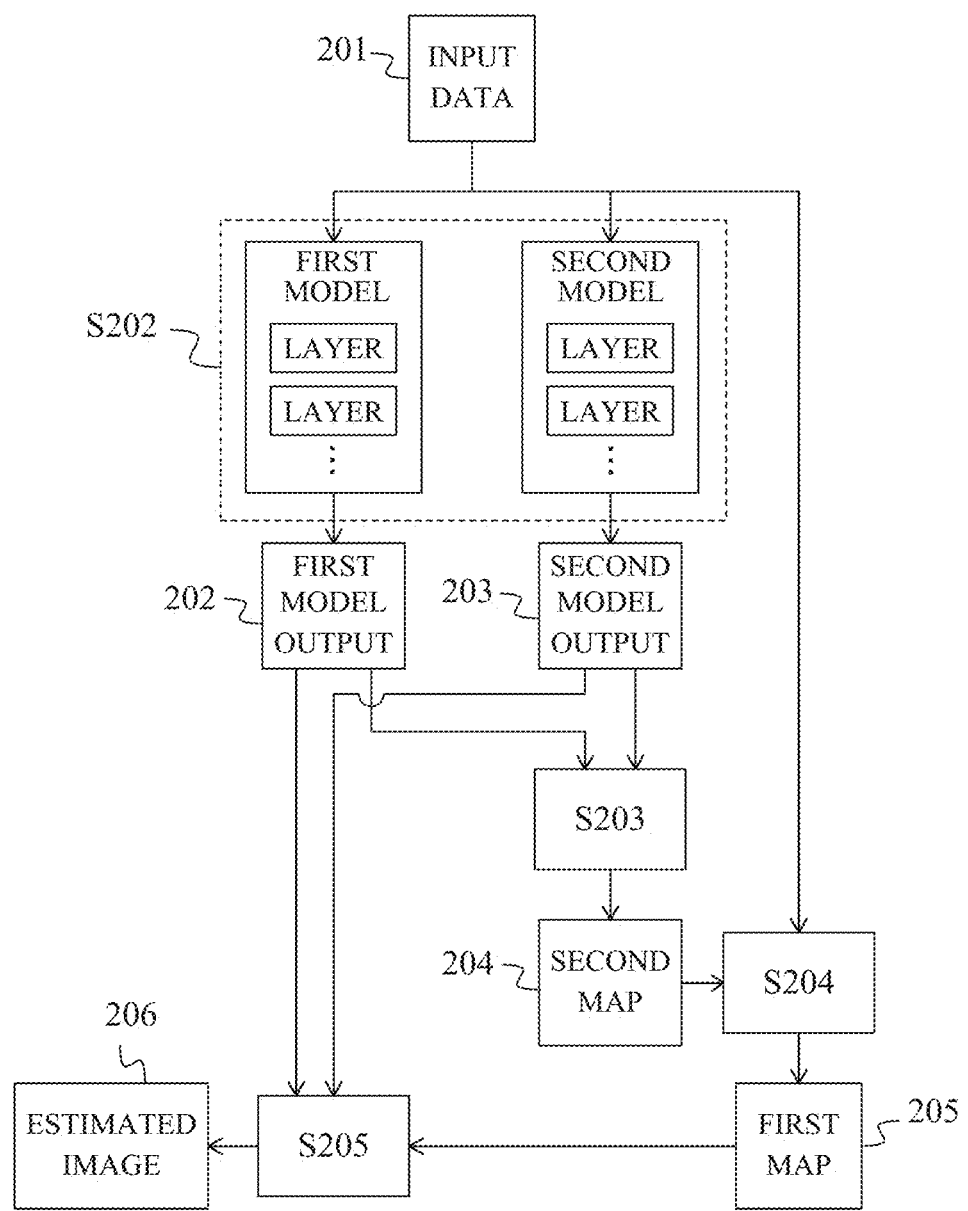
FIG. 1 is a diagram illustrating a flow of generation of an estimated image according to one or more aspects of the present disclosure.

Referring now to the accompanying drawings, a detailed description will be given of each embodiment according to the present disclosure. Corresponding elements in respective figures will be designated by the same reference numerals, and a description thereof will be omitted Before a detailed description of each embodiment, a description will be given of a problem to be solved by the present disclosure, a side effect that uniquely occurs when an image is estimated by using a machine learning model. When estimating an image, the machine learning model can execute processing with different effects depending on features of an input image, instead of processing with a uniform effect on the image. In the example of deblurring described above, the machine learning model internally determines a blur image relating to a saturated pixel, that is also referred to as a saturated blur image, and the other blur image, that is also referred to as a non-saturated blur image, and executes different correction processing. Thereby, both the blur images can be deblurred. However, the machine learning model may make an erroneous determination, and when the correction processing for the saturated blur image is executed on the non-saturated blur image, the above-mentioned artifact occurs. The same applies to estimation other than deblurring on an image including a saturated pixel, and when the machine learning model executes processing of different effects depending on the feature of the input image, if processing different from the processing suitable for the feature is executed, the side effect occurs. A phenomenon of the side effect depends on the content of the estimation on the image executed by the machine learning model and on a learning method. A specific example will be described in each embodiment.

Next, a description will be given of the gist of the present disclosure which solves this problem. The present disclosure suppresses the side effect unique to the machine learning model by using results of estimation, first model output and second model output, each of which is acquired from estimation on a captured image by each of two different machine learning models, a first machine learning model and a second machine learning model. For a purpose of estimation on an image, the second machine learning model is more effective than the first machine learning model, but the side effect may occur in the second model output. On the other hand, the first machine learning model has a small effect for the purpose of the estimation on an image, but the side effect does not occur, or is small, in the first model output. Based on a comparison based on the captured image or the first model output and the second model output, an estimated image is generated that matches the purpose of the estimation on the image. The estimated image is an image in which the side effect is suppressed, and is generated by using the first model output and the second model output. A first map may be generated based on a comparison based on the captured image or the first model output and the second model output, and the estimated image may be generated based on the first map. The first map is a map that determines an area in which the first model output or the second model output is used in the generation of the estimated image. That is, the first map indicates an area in which the side effect occurs in the second model output. The first model output without the side effect is used in the area with the side effect, and thereby it is possible to acquire the estimated image in which the desired effect of the estimation on the image is large and the side effect is suppressed.

In the following explanation, learning is a phase that determines a weight for the machine learning model based on the learning data set, and estimation is a phase that executes estimation on an image using a captured image in the machine learning model by using the learnt weight. The machine learning model includes, for example, a neural network, genetic programming, a Bayesian network, and the like. The neural network includes a CNN (Convolutional Neural Network), a GAN (Generative Adversarial Network), an RNN (Recurrent Neural Network) and the like.

First Embodiment

First, a description will be given of an image processing system in the first embodiment of the present disclosure. In this embodiment, deblurring a captured image including a saturated pixel is a purpose of estimation on an image performed by the machine learning model. The blur to be corrected is blur caused by aberration or diffraction generated by an optical system, an optical low pass filter, or a pixel opening of an image sensor. However, this embodiment is not limited to this, and the effect of this embodiment can be similarly acquired in correction of blur caused by defocus or shake. Similarly, the effect of this embodiment can be acquired in estimation on an image other than deblurring.

Figure 2:
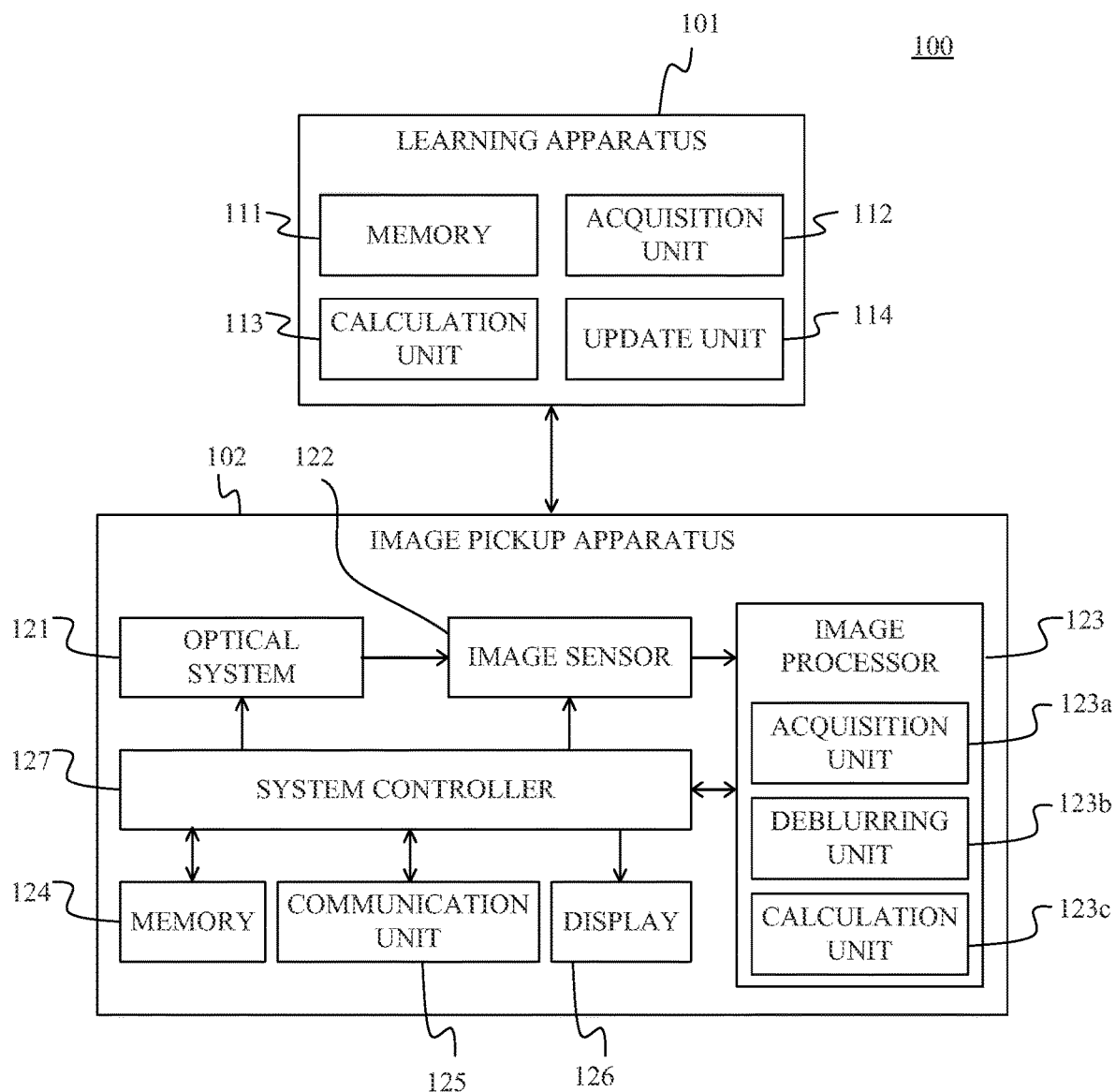
FIG. 2 is a block diagram illustrating an image processing system according to one or more aspects of the present disclosure.
Figure 3:
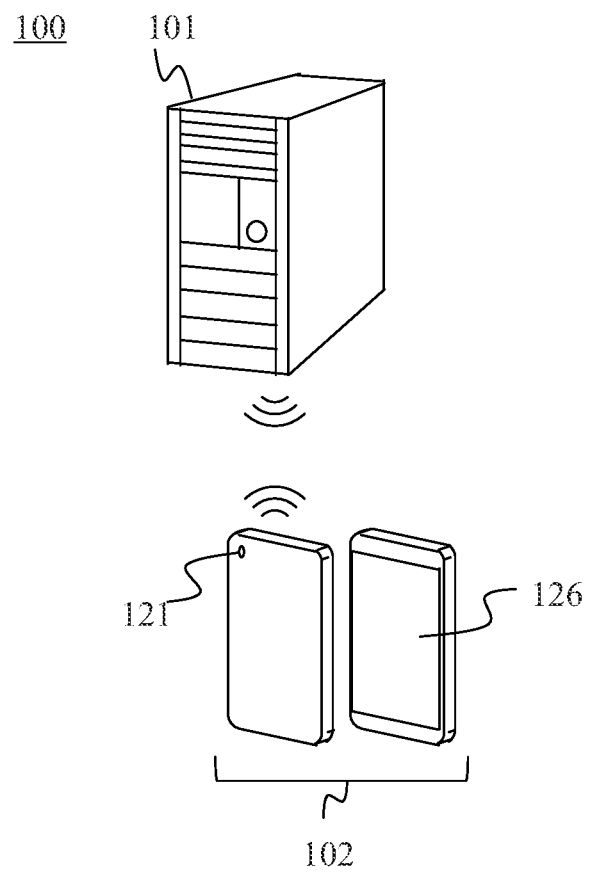
FIG. 3 is an external view illustrating the image processing system according to one or more aspects of the present disclosure.

FIG. 2 is a block diagram illustrating an image processing system 100. FIG. 3 is an external view illustrating the image processing system 100. The image processing system 100 includes a learning apparatus 101 and an image pickup apparatus 102 connected to each other via a wired or wireless network. The learning apparatus 101 includes a memory 111, an acquisition unit 112, a calculation unit 113, and an update unit 114.

The image pickup apparatus 102 includes an optical system 121, an image sensor 122, an image processor 123 as an image processing apparatus, a memory 124, a communication unit 125, a display 126, and a system controller 127. The optical system 121 is configured to collect light entering from an object space and to form an object image. The optical system 121 has function of performing zooming, diaphragm adjustment, autofocus, and the like, as necessary. The image sensor 122 is configured to convert the object image into an electric signal by photoelectric conversion and to generate a captured image. The image sensor 122 is, for example, a CCD (Charge Coupled Device) sensor, a CMOS (Complementary Metal-Oxide Sensor) sensor, or the like. The captured image is affected by blur caused by aberration or diffraction generated in the optical system 121 or pixel opening of the image sensor 122. When an optical low pass filter is included, the captured image is also affected by blur caused by the optical low pass filter.

The image processor 123 includes an acquisition unit 123a, a deblurring unit 123b, and a calculation unit 123c, and is configured to generate an estimated image in which the blur in the captured image is corrected. An estimated image with a side effect suppressed is generated by a first machine learning model and a second machine learning model respectively generating first model output and second model output in each of which a correction component of blur in the captured image is estimated, and by executing an image processing method according to this embodiment. A weight learnt by the learning apparatus 101 is used in each of the first machine learning model and the second machine learning model. Weight information is read in advance from the learning apparatus 101 via the communication unit 125 and stored in the memory 124. A detailed description will be given later of learning and estimation in the machine learning model and suppression of the side effect. The estimated image is stored in the memory 124 and displayed on the display 126. The system controller 127 is configured to control the above operation. The captured image and the estimated image may be a grayscale image or an image having a plurality of color components, and may be sn undeveloped RAW image or a developed image.

Figure 4A:
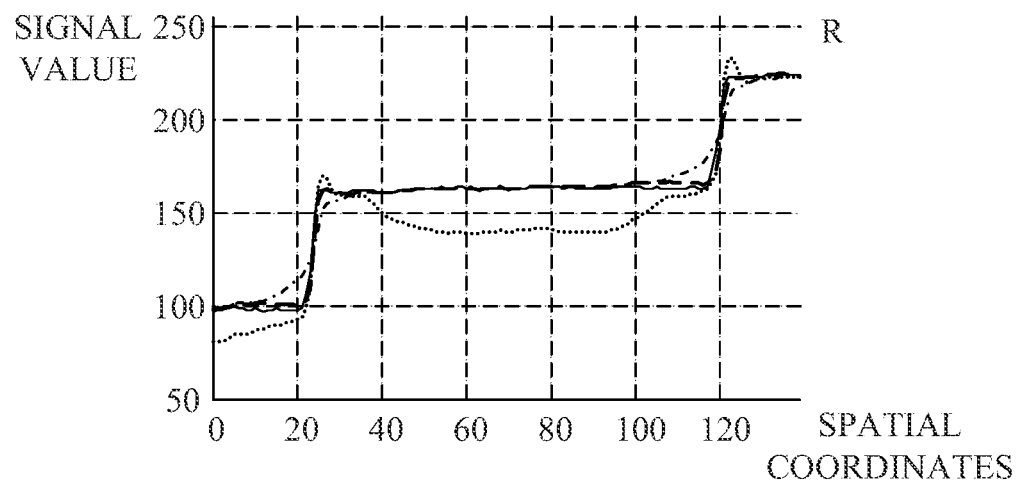
FIGS. 4A to 4C are explanatory diagrams each illustrating an artifact according to one or more aspects of the present disclosure.
Figure 4B:
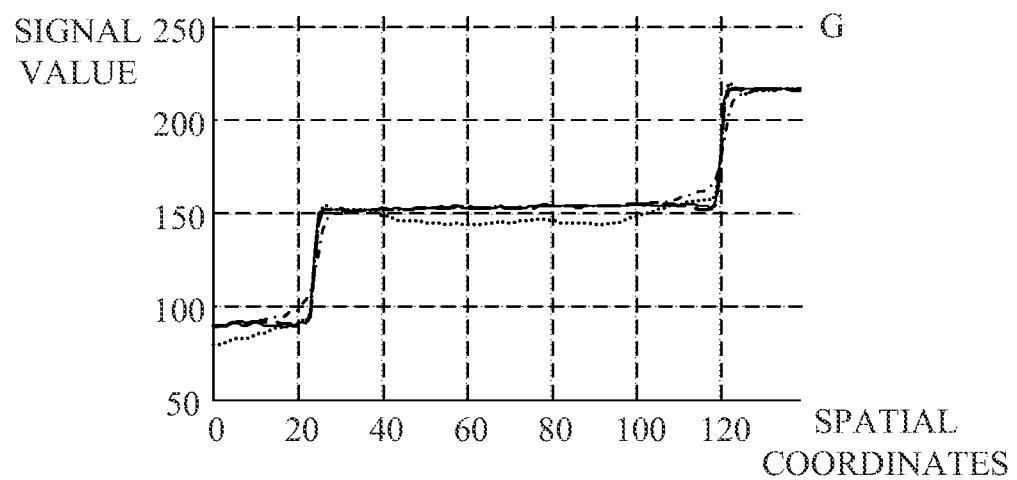
Figure 4C:
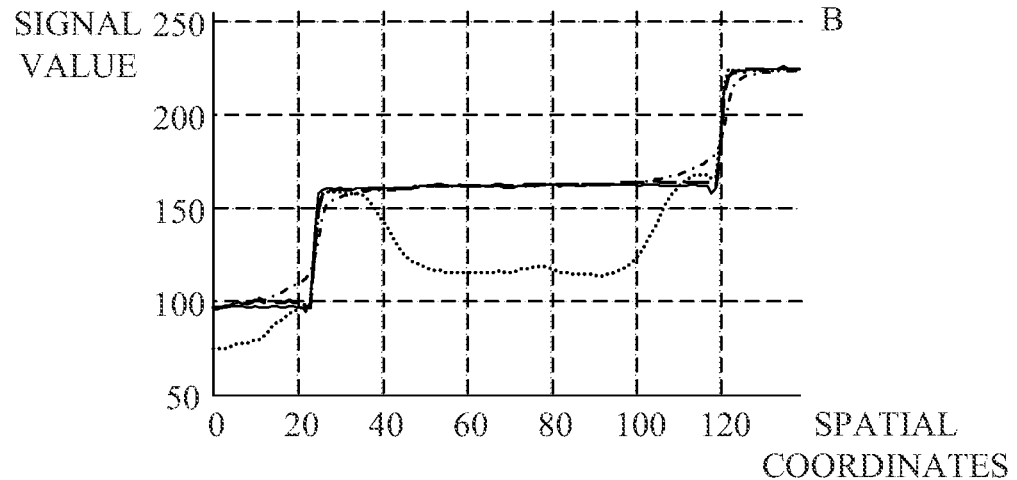

Next, a detailed description will be given of the side effect that uniquely occurs when the machine learning model deblurs the captured image. The side effect in this case is occurrence of an artifact, that is a false structure, caused by a local decrease or increase in the signal value that is not consistent with the actual object structure. The artifact will be described with reference to FIGS. 4A to 4C. FIGS. 4A to 4C are explanatory diagrams illustrating the artifact. FIGS. 4A to 4C illustrate spatial changes in the signal value of the image, and respectively correspond to color components of R, G, and B, that is red, green, and blue, respectively. In each of FIGS. 4A to 4C, a horizontal axis represents spatial coordinates and a vertical axis represents a signal value.

Here, the image is an image developed to 8 bits, and a saturation value is 255. In each of FIGS. 4A to 4C, a dot-dash-dot line represents a captured image, that is a blur image, and a thin solid line represents a ground truth image without blur. None of the pixels reaches the saturation value, and thus no saturated pixel is included. A dotted line represents the second model output, that is a deblurred image, which is acquired by deblurring the captured image using the second machine learning model. The second machine learning model is a model configured to deblur both a blur image relating to a saturated pixel, which is also referred to as a saturated blur image, and a blur image not relating to the saturated pixel, which is also referred to as a non-saturated blur image. In the second model output, blur in an edge is corrected, but decrease occurs in signal values near the center, the decrease not occurring in the ground truth image. This decrease does not occur in the vicinity of the edge, but occurs at a distant position from the edge, and the area of occurrence is wide. Therefore, the decrease can be identified as a side effect that is different from undershoot. This is the artifact, which is the side effect unique to the machine learning model. According to the comparison of FIGS. 4A to 4C, a degree of decrease in the signal value differs depending on the color component. In FIGS. 4A to 4C, the degree of decrease increases in the order of G, R, and B. Therefore, in the second model output, a dark area colored with green occurs as an artifact in an area which is a flat portion in the ground truth image. In FIGS. 4A to 4C, the case where the signal value becomes less than the signal value in the ground truth image is described as an example, but the signal value may increase.

Next, a cause for occurrence of the artifact will be described. The cause is that the machine learning model cannot completely distinguish between a blur image including a saturated pixel, that is a saturated blur image, and a blur image only including a non-saturated pixel, that is a non-saturated blur image. For further explanation, a description will be given that the machine learning model performs different deblurring depending on presence or absence of saturation. Each of FIGS. 5A to 5D illustrate a spatial change of a signal value in a captured image and a ground truth image not including blur. In FIGS. 5A to 5D, each horizontal axis represents the spatial coordinates and each vertical axis represents the signal value. In FIGS. 5A to 5D, each solid line represents the captured image, and each broken line represents the ground truth image.

Figure 5A:
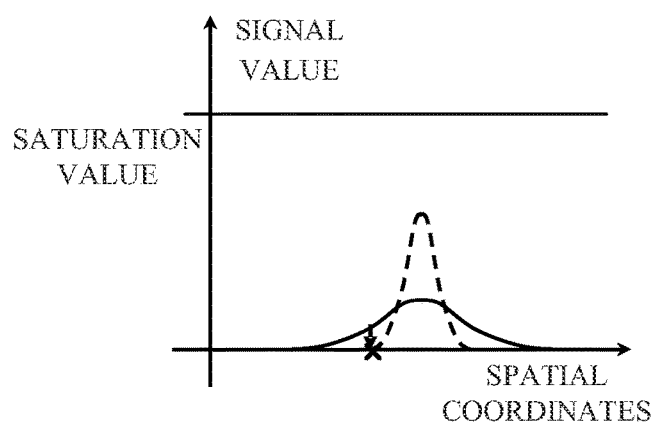
FIGS. 5A to 5D are explanatory diagrams each illustrating cause for occurrence of the artifact according to one or more aspects of the present disclosure.
Figure 5B:
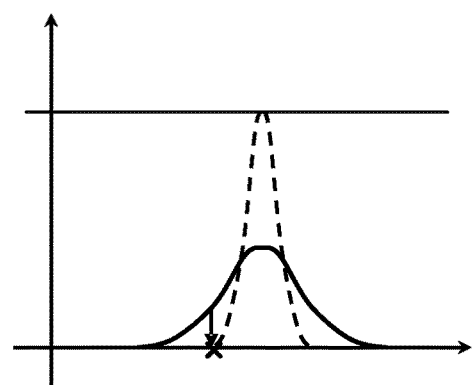
Figure 5C:
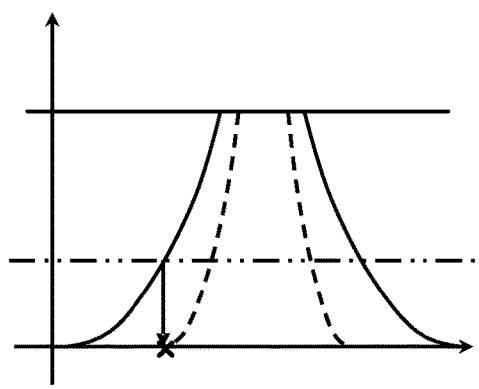
Figure 5D:
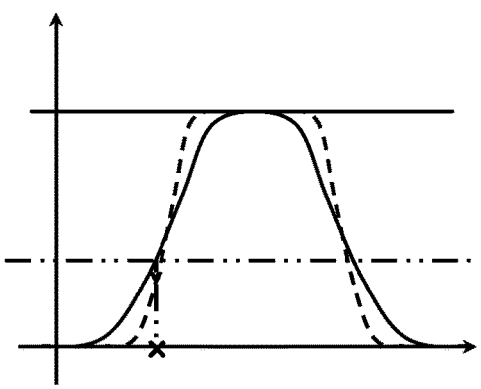

In each of FIGS. 5A to 5C, the same object is captured, and the exposure at the time of image pickup is different. At the exposure of FIG. 5C, a saturated pixel exists. The arrows in FIGS. 5A to 5D represent the difference between signals of the captured image and the ground truth image, at the pixels where the signal value of the object becomes zero in the ground truth image. This difference in the signals corresponds to an ideal correction residual for deblurring. The more overexposure the captured image, the larger the correction residual. Therefore, in deblurring, the correction residual is determined by brightness of an object, and the brighter the object, the larger the correction residual. FIG. 5D illustrates a spatial change of a signal value when an image of objects having different shapes is captured at a longest exposure with which saturation does not occur. Although the blur images of FIGS. 5C and 5D are substantially the same, the correction residual at the same signal value is larger in FIG. 5C than in FIG. 5D. That is, the machine learning model that can deblur the saturated blur image makes different estimations for the saturated blur image and the non-saturated blur image even at the same brightness, and estimates a larger correction residual for the saturated blur image.

However, it is not easy to determine whether a target pixel for deblurring is part of a saturated blur image or of a non-saturated blur image. The farther the target pixel for deblurring from a saturated pixel, the more difficult this determination becomes. In particular, the brighter the object or the larger the blur, the farther a position to which the saturated blur image spreads from the saturated pixel, making it difficult to make the determination. Therefore, during deblurring, the machine learning model may determine the target pixel of a non-saturated blur image to be part of a saturated blur image. As described above, when deblurring the saturated blur image, the machine learning model estimates a correction residual larger than a correction residual in the non-saturated blur image. Thus, an excessive correction residual may be applied to the non-saturated blur image, and an artifact may occur in which the signal value decreases only in the area that is erroneously determined as the saturated blur image.

On the other hand, the machine learning model which does not deblur the saturated blur image, that is the first machine learning model, does not generate an artifact, not making determination itself on the non-saturated blur image and the saturated blur image. The broken line in each of FIGS. 4A to 4C represents the first model output generated by the first machine learning model which only deblurs the non-saturated blur image and does not deblur the saturated blur image, and indicates that the blur has been corrected but the artifact has not occurred. However, in this case, the blur of the saturated blur image is not corrected.

In general, an optical system for visible light is often designed so that performance of G is the best in those of R, G, and B. That is, each of R and B has a larger spread of blur (PSF: point spread function) than that of G, and an edge of the saturated blur image acquired by image pickup for a high-brightness object is more likely to be colored with R and B, that is, purple fringe or the like is likely to occur. When this saturated blur image is corrected, correction residuals of R and B is larger than that of G. Thus, when the pixel of the non-saturated blur image is erroneously determined as the pixel of the saturated blur image, each decrease amount of the signal value of each of R and B is larger than that of G, and as illustrated in FIGS. 4A to 4C, an artifact occurs as a dark area colored with green.

Each of FIGS. 5A to 5D illustrates a case where the captured image includes a larger signal value than the signal value in the ground truth image, but in the area near the high-luminance part of the blur image, the ground truth image has a larger signal value than that of the captured image. Hence, when the pixel of the non-saturated blur image is erroneously determined as the pixel of the saturated blur image, an artifact may occur which increases the signal value to a larger extent than the signal value in the ground truth image.

Next, a description will be given of a method for suppressing the artifact. The artifact is caused because it is impossible for the machine learning model to accurately determine whether the target pixel is included in the saturated blur image or the non-saturated blur image. Therefore, the artifact can be suppressed by telling the machine learning model which includes the target pixel. However, this method is difficult to realize. For example, it is assumed that there is an HDR (high dynamic range) ground truth image which does not include blur or includes blur of small enough value and whose signal value is not clipped by the saturation value. A map representing a range of the saturated blur image can be generated by extracting an area only of the saturated pixel of the captured image from the HDR ground truth image, and applying the blur generated by image pickup. The artifact is suppressed by inputting this map into the machine learning model together with the captured image and performing estimation (similarly, the same map is input during learning). However, since the purpose of deblurring is to estimate the ground truth image or the HDR ground truth image in the first place, the HDR ground truth image is unknown and thus this method cannot be used. Therefore, this embodiment suppresses the artifact by using two machine learning models, the first and second machine learning models, having different deblurring effects on the high-luminance object. The specific method will be described later in the description of the learning by the learning apparatus 101 and processing executed by the image processor 123.

Figure 6:
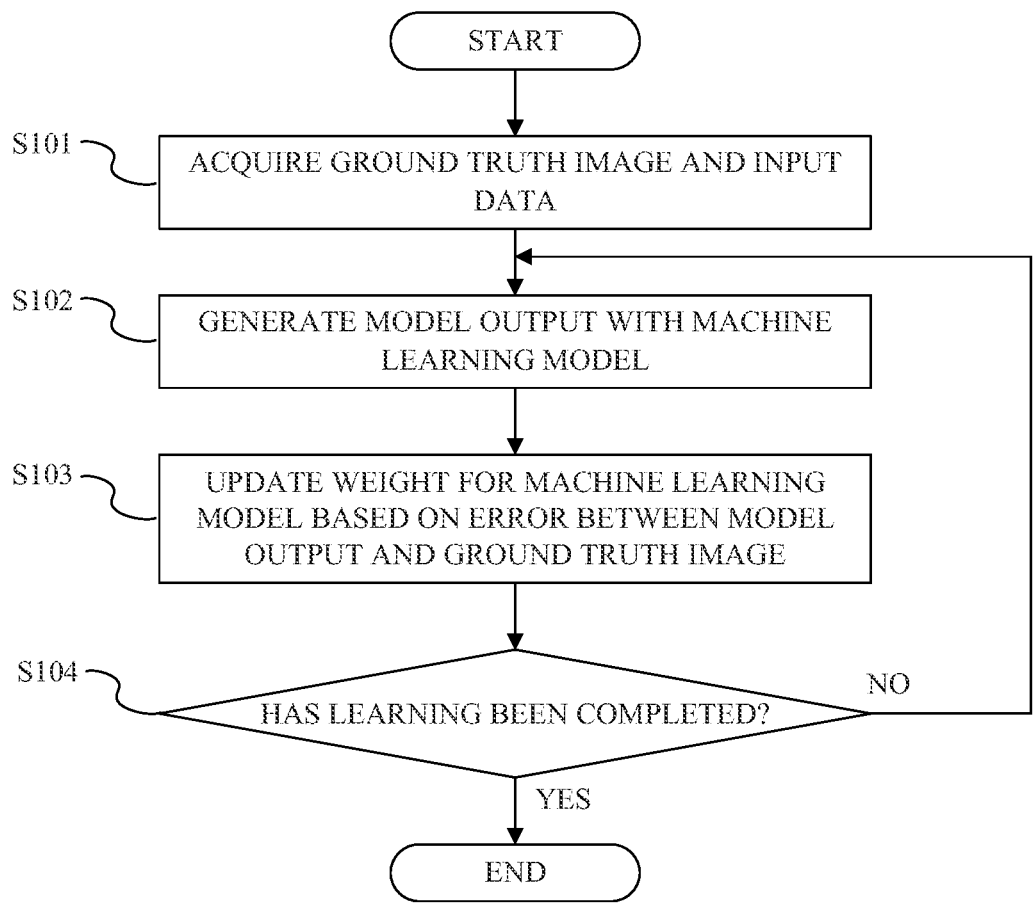
FIG. 6 is a flowchart illustrating learning in a machine learning model according to one or more aspects of the present disclosure.

Next, with reference to FIG. 6, a description will be given of weight learning by the machine learning models, the first machine learning model and the second machine learning model, executed by the learning apparatus 101. FIG. 6 is a flow chart illustrating learning by the machine learning model. Each step of FIG. 6 is executed by any of the memory 111, the acquisition unit 112, the calculation unit 113, or the update unit 114 of the learning apparatus 101. The learning is performed separately for each of the first machine learning model and the second machine learning model. Thus, in the following description, when there is no difference between the first machine learning model and the second machine learning model, each machine learning model is simply referred to as a machine learning model.

First, in step S101, the acquisition unit 112 acquires one or more pairs of a ground truth image and input data from the memory 111. The input data is data to be input to the machine learning model, and includes a training image at a time of learning. The training image and the ground truth image are a pair of images in which the same object is included and intensity of applied blur is different. The first machine learning model performs learning so that an effect of deblurring on the high-luminance object becomes small relative to that of the second machine learning model, and thus a pair of a training image and a ground truth image as described below is prepared. In either method, a pair of a training image and a ground truth image is generated by performing image pickup simulation on an original image. The original image is an image of CG (Computer Graphics) or an image captured by an optical system having higher performance than performance of the optical system 121, and has a higher frequency component than a frequency component of the captured image. Alternatively, by reducing the image, an original image having a higher frequency component than that of the captured image may be generated. The original image is one or more images including various objects such as edges of various directions and intensities, gradation, flat portions, and the like.

A first example of generating the pair is a method of using different original images between the first machine learning model and the second machine learning model. For the first machine learning model, to an original image only having a signal value equal to or less than the saturation value of the captured image, a training image is generated by adding blur generated by the optical system 121 and the image sensor 122, and a ground truth image is generated by not adding the blur or by adding blur smaller than the blur added to the training image. In this case, since the original image has only the signal value equal to or less than the saturation value, none of the pairs of the training image and the ground truth image includes lost information on the object which is lost due to saturation. Thus, thorough learning using these training images and ground truth images, the first machine learning model only learns deblurring for the non-saturated blur image and does not make determination on the saturated blur image and the non-saturated blur image, and thus the artifact does not occur.

Next, in the second machine learning model, to an original image having a signal value higher than the saturation value of the captured image, a training image is generated by adding blur generated by the optical system 121 and the image sensor 122, and a ground truth image is generated by not adding blur or adding small blur. Here, the signal values of the training image and the ground truth image are clipped by the saturation value of the captured image. The second machine learning model learns deblurring for each of the saturated blur image and the non-saturated blur image, and can also deblur the saturated blur image, but the artifact may occur.

A second example for generating the pair is a method of using different methods for generating a ground truth image between the first machine learning model and the second machine learning model. In this method, each of the first machine learning model and the second machine learning model uses an original image having a signal value higher than the saturation value of the captured image. The same applies to the second machine learning model as in the first example. In the first machine learning model, a training image is generated as in the first example. The ground truth image is generated as follows. First, from the original image or the training image, an area having a signal value equal to or higher than the saturation value of the captured image is extracted. The original image in which a signal value is zero for the area other than the extracted area is given the same blur as the training image, added to the original image in which a signal value is zero for the extracted area, and clipped at the saturation value. As a result, a ground truth image is generated in which the same blur as the training image is added only for high-luminance objects that exceed the saturation value. By using this pair of the ground truth image and the training image, the first machine learning model performs learning so as to only deblur non-saturated blur image, and artifact does not occur.

It is necessary to match a format of the captured image to be deblurred with a format of the training image. For example, when deblurring is to be performed on an image in a state of an undeveloped RAW image, the training image has to also be equivalent to an undeveloped RAW image. When deblurring is to be performed on a captured image having a plurality of color components at once, the training image has to also have a plurality of color components. A format of the ground truth image is the same as the format of the training image if deblurring only is to be performed with the machine learning model. When, in the machine learning model, development processing is to be also performed on a RAW image at the time of deblurring, the training image is an undeveloped RAW image and the ground truth image is a developed image. In this way, the format of the ground truth image may be changed as needed.

The input data may include information other than the training image. For example, the information is information on a focal length, F-number, in-focus distance, image height, and azimuth of the optical system 121, a separation method and cutoff frequency of the optical low pass filter, a pixel pitch of the image sensor 122, and the like, each of which corresponds to the blur added to the training image Thereby, even when a plurality of different kinds of blur are mixed, the machine learning model can identify the blurs, and can perform deblurring with high accuracy. When noise is added to the training image, information indicating the intensity of the added noise may be included. When information other than the training image is added to the input for learning, the same information is input to the machine learning model at the time of estimation.

Subsequently, in step S102, the calculation unit 113 inputs the input data to the machine learning model and generates model output. The model output is a training image deblurred by the machine learning model in the middle of learning. In this embodiment, the machine learning model uses a CNN, but the present disclosure can be applied to other models as well. The CNN has a plurality of convolutional layers. At the first time of learning, a weight for the CNN (filter coefficients and bias) can be determined by random numbers. The first machine learning model and the second machine learning model are CNNs having the same network structure, but it may not be necessary to use CNNs having the same structure.

Subsequently, in step S103, the update unit 114 updates the weight for the machine learning model based on a difference, that is an error, i.e., a loss function, between the model output and the ground truth image. In this embodiment, the loss function is a Euclidean norm of a difference between the signal values of the model output and the ground truth image. However, the loss function is not limited to this. When a plurality of pairs of input data and a ground truth image are acquired in step S101, the value of the loss function is calculated for each pair. By using the calculated value of the loss function, the weight is updated by back-propagation or the like. The estimated model output may be the difference between the ground truth image and the training image, that is, may be the correction residual. In this case, the weight is updated by using an error between the model output and the correction residual that is the difference between the ground truth image and the training image.

Subsequently, in step S104, the update unit 114 determines whether or not the learning by the machine learning model has been completed. The determination on the completion of learning can be made by whether the number of repetitions of learning (weight update) has reached a predetermined number of times, whether an amount of change in weight at the time of update is smaller than a predetermined value, or the like. When it is determined in step S104 that the weight learning is not completed, the process returns to step S101, and the acquisition unit 112 acquires one or more new pairs of input data and a ground truth image. On the other hand, when it is determined that the weight learning is completed, the update unit 114 ends the learning and stores the weight information in the memory 111.

Figure 7:
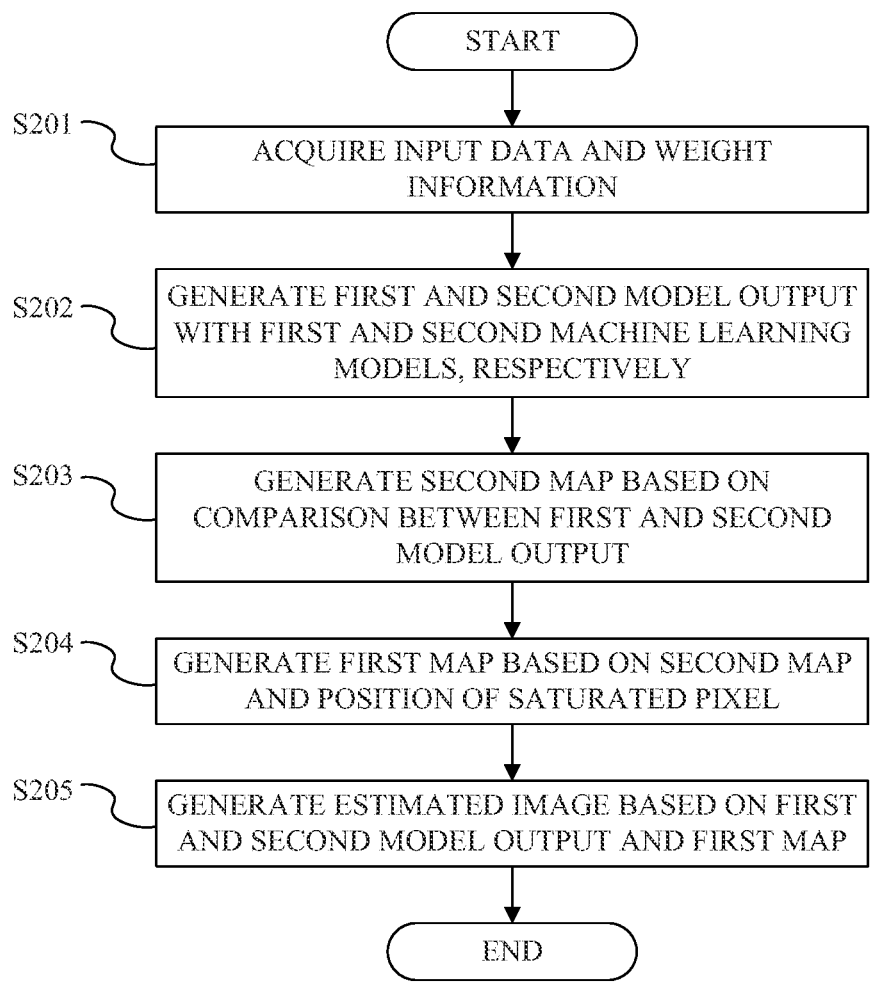
FIG. 7 is a flowchart illustrating the generation of the estimated image according to one or more aspects of the present disclosure.

Next, with reference to FIGS. 1 and 7, a description will be given regarding generation of an estimated image generated by deblurring a captured image, which is executed by the image processor 123. FIG. 1 is a diagram illustrating a flow of generating the estimated image. Each step of FIG. 7 is executed by any of the acquisition unit 123a, the deblurring unit 123b, or the calculation unit 123c of the image processor 123.

First, in step S201, the acquisition unit 123a acquires input data 201 and the weight information used in each of the first machine learning model and the second machine learning model. The input data 201 includes the captured image, and when the input data at the time of learning includes information other than the training image, the same information is also included. The weight information is acquired from the memory 124.

Subsequently, in step S202, the deblurring unit 123b as an acquisition unit generates (acquires) first model output 202 and second model output 203 from the input data 201 including the captured image, by using the first machine learning model and the second machine learning model, respectively. The first model output 202 and the second model output 203 are the deblurred captured images. The second model output 203 is an image in which all blur images, both the non-saturated blur image and the saturated blur image, have been deblurred, but in which an artifact may have occurred. The first model output 202 is an image in which only the non-saturated blur image has been deblurred, and in which no artifact has occurred. In a case where the model output is the correction residual at the time of learning, the first model output 202 and the second model output 203 are also correction residuals.

Subsequently, in step S203, the calculation unit 123c generates the second map 204 based on a comparison between the first model output 202 and the second model output 203. This embodiment uses the difference between the first model output 202 and the second model output 203 as the comparison, but the comparison is not limited to this. As another example, the comparison may be a ratio of the difference (correction residual) between each of the first model output 202 and the second model output 203, and the captured image. Alternatively, the first model output 202 and the second model output 203 may be divided into a plurality of partial areas and a correlation may be calculated between the partial areas at the same position. When the model output is the correction residual, the comparison can be performed using any of the difference, the ratio, or the correlation.

The second map 204 is a map indicating an area in which the difference between the first model output 202 and the second model output 203 satisfies a predetermined condition, and has a second value at the area. The predetermined condition indicates that the difference between the first model output 202 and the second model output 203 is large (or an absolute value of the difference or ratio is large, or the correlation is small). In this embodiment, the predetermined condition is set so that the absolute value of the difference is larger than a predetermined threshold value, and the second map 204 is generated by binarizing the difference depending on whether or not the difference is larger than the predetermined threshold value. The area in which the difference is larger than the predetermined threshold is set to 1 (second value), and the other areas are set to 0 (first value). However, this embodiment is not limited to this, and the second map 204 may be generated by clipping the difference at a predetermined threshold value (second value).

Figure 8A:
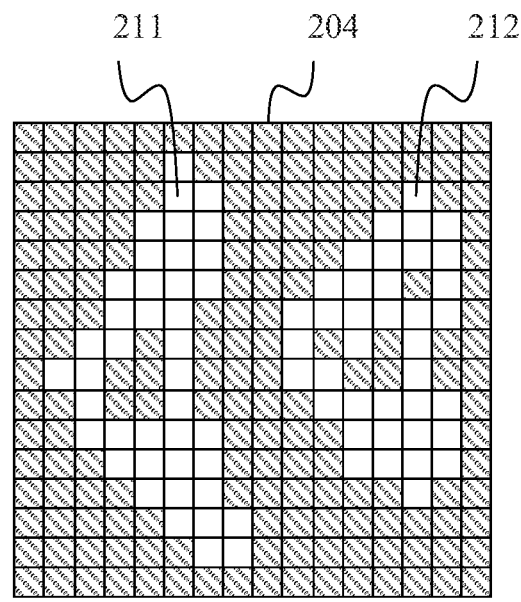
FIGS. 8A and 8B are exploratory diagrams relating to generation of a first map according to one or more aspects of the present disclosure.

FIG. 8A is an example of the second map 204. A white area with a value of 1 represents an area where the difference is larger than the predetermined threshold, and a shaded area with a value of 0 represents the other area. Since both the first model output 202 and the second model output 203 deblur the non-saturated blur image, the difference in the area corresponding to the non-saturated blur image becomes small. On the other hand, since the deblurred saturated blur image and the artifact are included only in the second model output 203, the areas thereof have large difference and appears in the second map 204 as represented by white areas 211 and 212 of FIG. 8A. FIG. 8A only represents an example of one color component. When the captured image has a plurality of color components, the second map 204 also has a plurality of color components. When the plurality of color components are arranged in pixels at different positions as in a Bayer image, the captured image, the first model output 202, and the second model output 203 may be divided into each color component, and processing subsequent to step S203 may be executed.

Subsequently, in step S204 of FIG. 7, the calculation unit 123c generates a first map 205 based on the second map 204 and a position of a saturated pixel in the captured image. Each of the white areas 211 and 212 in the second map 204 represents an area where the saturated blur image is deblurred or an area where an artifact occurs. The saturated blur image includes the saturated pixel of the captured image. That is, when an area surrounded by each of the white areas 211 and 212 does not include the saturated pixel of the captured pixel, the area includes an artifact.

Figure 8B:
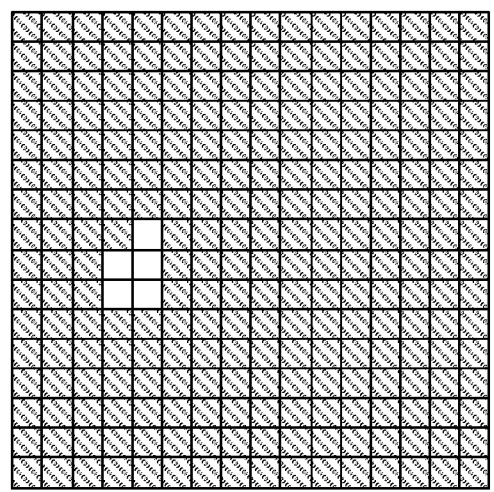

FIG. 8B is a map acquired by binarizing the captured image with the saturation value, and represents only the saturated pixel with the value of 1 (second value) and the others with the value of 0. Based on the position of the saturated pixel in FIG. 8B, it can be seen that the area surrounded by the white area 212 of the second map 204 does not include the saturated pixel. That is, the white area 212 is an area where the artifact occurs. In this way, from the second model output 203, the area where the artifact occurs can be extracted.

In this embodiment, specifically, the area with the artifact is extracted from the second map 204 as follows. First, the position of the saturated pixel of the captured image is acquired. For example, FIG. 8B includes five points, and when the upper left horizontal and vertical coordinates (x, y) are (0,0), the coordinates of these five points are (3,8), (3,9), (4,7), (4,8), and (4,9), respectively.

Next, one of the positions of the saturated pixels is selected and the positions surrounding the selected pixel are acquired. For example, when (3,8) is selected, the surrounding positions are four points of (2,8), (3,7), (4,8), and (3,9) (or may be eight points including diagonal directions). Filling on the second map 204 is executed with each of these four points as a starting point. Filling is processing that replaces a signal value with a predetermined value (first value) for a closed space that includes a start point and has the same signal value as the start point.

In the example of FIG. 8A, since the area with a large difference is represented by 1 (second value), the filling is performed with 0 (first value). For the filling, for example, a scanline seed fill algorithm or the like is used. Since the four points of the start points are set for each of the five saturated pixels, the filling processing is repeated twenty times here. By the filling, the white area 211 of FIG. 8A is filled with 0, and only the white area 212 remains as an area with an artifact occurring. This is the first map 205 indicating the area where the side effect occurs in the second model output 203.

The position of the saturated pixel may be acquired from another image as long as the image is an image based on a captured image. For example, the first model output 202 or the second model output 203 may also be used. The first map 205 may be generated by the following method without using the binarization or the clipping. In the method, the second map 204 is the difference itself between the first model output 202 and the second model output 203, a start point is based on the position of the saturated pixel, and a closed space is removed in which the value of the difference satisfies a predetermined condition (in which the difference is equal to or larger than a predetermined threshold). The first map 205 is the remaining map from which the area where the difference value satisfies the predetermined condition has been extracted.

Subsequently, in step S205, the calculation unit 123c as a generation unit generates an estimated image 206 based on the first model output 202, the second model output 203, and the first map 205. In the second model output 203, all the blur images, the non-saturated blur image and the saturated blur image, of the captured image are deblurred, but the artifact may be included. In the first model output 202, only the non-saturated blur image is deblured, but no artifact is included.

The first map 205 is a map indicating an area where an artifact has occurred in the second model output 203, here, the artifact being indicated by a pixel having a second value of 1. Thus, in the second model output 203, by replacing the area indicated by the first map 205 with the first model output 202, the estimated image 206 can be acquired in which all the blur images in the captured image are deblurred and the artifact is suppressed.

A weighted average may be used instead of the replacement. In that case, in the area in which the artifact occurs indicated by the first map 205, the weight for the first model output 202 is larger than the weight for the second model output 203. The generated estimated image 206 is stored in the memory 124. In a case where the first model output 202 and the second model output 203 are correction residuals, the estimated image 206 can be acquired by adding the output to the captured image after the replacement. It may not be necessary to combine the first model output 202 and the second model output 203. For example, when it is determined from the first map 205 that there is no artifact, the second model output 203 may be used as the estimated image 206, and when it is determined that there is an artifact, the first model output 202 may be used as the estimated image 206. Thereby, the deblurring effect on the blur image may be decreased, but it becomes possible to always acquire the estimated image 206 in which the side effect is suppressed.

Next, a desirable condition will be described of this embodiment. The following conditions can be applied to each embodiment other than this embodiment. First, in a case where the captured image has a plurality of color component, the first map 205 may be common to all the color components. If steps S203 and S204 are executed for each color component, the area with the artifact indicated by the first map 205 differs depending on the color component. For example, when the captured image is a RAW image, G is likely to be saturated, and thus only G may be saturated while the neighboring R and B are not saturated. Hence, the position of the saturated pixel may differ depending on the color, and difference may occur in the first map 205. If the first map 205 different for each color component is used, for example, in the same area of the image, the first model output 202 is used for R and B and the second model output 203 is only used for G, and thus the estimated image looks discontinuous. Therefore, the first map 205 may be common to all the color components. Methods may be used such as a method of applying the first map 205 generated by a certain color component to all the color components, and a method of regarding that all the color components do not include an artifact, i.e., setting all the values to values other than the second value, when there is one color component not having the second value in the same or neighboring pixels in the first map 205. A method with which the artifact is most effectively suppressed is a method of regarding all the color components as ones including artifacts, i.e., setting all the values to the second value, when there is one color component having the second value in the same or neighboring pixels of the first map 205.

Next, when the captured image, the first model output 202, and the second model output 203 have the plurality of color components and are undeveloped RAW images, the first map 205 may be generated based on a white balance coefficient. The image viewed by the user is in a state where white balance correction is applied. The predetermined threshold value in step S203 may be set to a different value for each color component, and a ratio of the values may be determined by a ratio of the white balance coefficient. Alternatively, the predetermined threshold value may be fixed for each color component, and the white balance correction may be performed on the captured image, the first model output 202, and the second model output 203 to be compared.

Similarly, when the captured image, the first model output 202 and the second model output 203 are the undeveloped RAW images, the first map 205 may be generated based on gamma correction. The image viewed by the user is in a gamma-corrected state. The predetermined threshold value in step S203 may be changed based on the magnitude of the signal value of a pixel of any of the captured image, the first model output 202, or the second model output 203, and the gamma correction. The gamma correction raises gradation in a dark area and lowers gradation in a bright area. Thus, the larger the signal value of a pixel, the smaller the predetermined threshold value, and the smaller the signal value of a pixel, the larger the predetermined threshold value. Alternatively, the predetermined threshold value may be constant, and the gamma correction may be performed on the captured image, the first model output 202, and the second model output 203, each of which is to be compared. In a case where the model output is the correction residual, the gamma correction may be considered in a state where the output is added to the captured image.

Next, in the second map 204, the filling to the first value may be performed after the pixel at the position of the saturated pixel based on the captured image is replaced with the second value. In the comparison between the first model output 202 and the second model output 203, the difference in the position of the saturated pixel of the captured image is likely to be small, and the position often does not have the second value in the second map 204. In FIG. 8A, the pixel at the position of the saturated pixel of the captured image has the first value. Therefore, even when the filling to the first value is performed with the position of the saturated pixel of the captured image as the start point, the white area 211 is not filled. In order for the white area 211 to be filled, it is necessary to start from positions surrounding the position of the saturated pixel. However, for example, when the four surrounding points are set as the start points, filling is performed for each start point. Therefore, four times of filling are executed and a processing load becomes large. However, in the second map 204, when the pixel at the position of the saturated pixel is replaced with 1, the second value, the white area 211 can be filled with only one point at the position of the saturated pixel as the start point, and the processing load is decreased. In the case of FIG. 8A, the number of times of repeating filling is reduced from twenty times to five times.

The position of the saturated pixel may be corrected based on the position of the pixel replaced with the first value by the filling on the second map 204, and the filling may be executed again from, as the start point, a pixel based on the corrected position of the saturated pixel. For example, in FIG. 8A, each of the five points of the saturated pixels has four surrounding start points, and thus the number of the start points of the filling is twenty. However, for example, when the filling is performed while the start point is set to (2, 8), the white area 211 is completely filled, and it is not necessary to repeat the filling thereafter. Therefore, the position of the pixel replaced with the first value by the filling may be acquired, and may be excluded from the position of the saturated pixel. The processing load can be reduced by performing the next filling with the position of the remaining saturated pixel as the start point. Thereby, in the example of FIG. 8A, the first map can be generated by executing the filling once.

As described above, according to this embodiment, it is possible to provide the image processing system which can suppress the side effect uniquely occurring when the image is estimated by the machine learning model.

Second Embodiment

Next, a description will be given of an image processing system in a second embodiment of the present disclosure. The purpose of this embodiment is to suppress overcorrection and to correct blur in a captured image even when the blur is different from learnt blur due to manufacturing variation or the like. However, this embodiment can be similarly applied to other estimation on an image.

Figure 9:
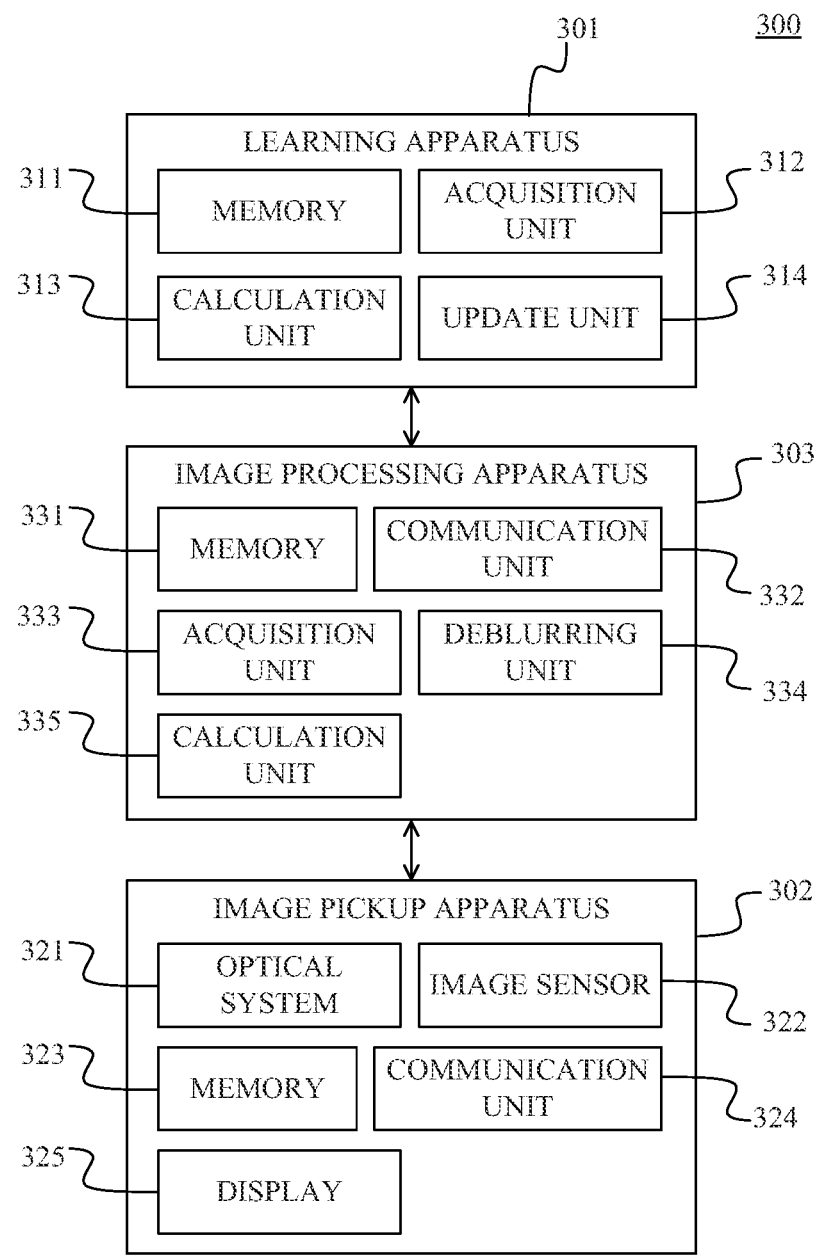
FIG. 9 is a block diagram illustrating an image processing system according to one or more aspects of the present disclosure.
Figure 10:
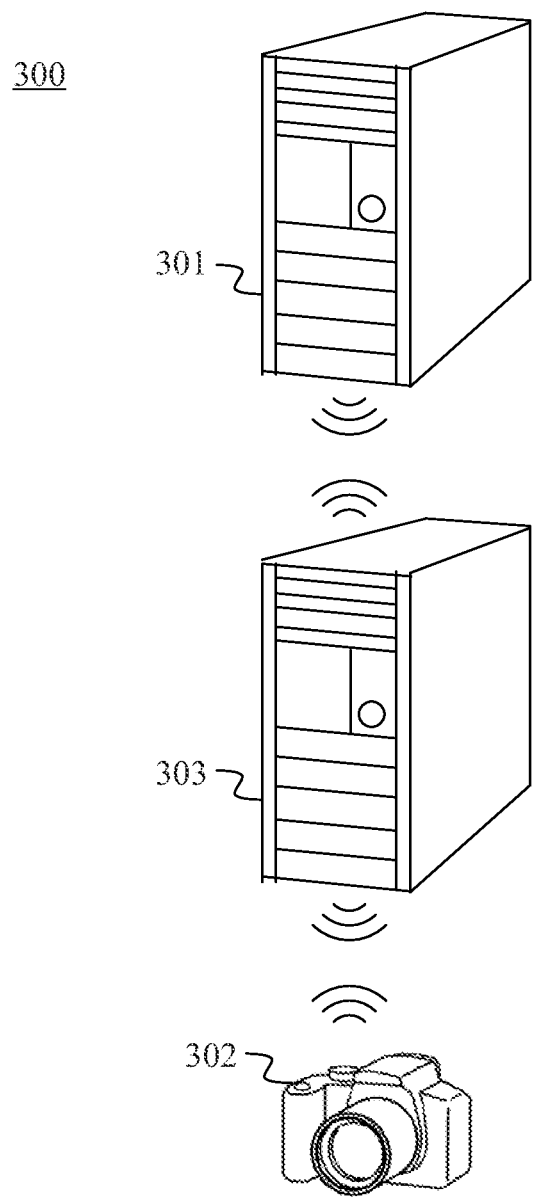
FIG. 10 is an external view illustrating the image processing system according to one or more aspects of the present disclosure.

FIG. 9 is a block diagram illustrating an image processing system 300. FIG. 10 is an external view illustrating the image processing system 300. The image processing system 300 includes a learning apparatus 301, an image pickup apparatus 302, and an image processing apparatus 303, and each apparatus is connected via a network or the like. The image pickup apparatus 302 includes an optical system 321 and an image sensor 322, a memory 323, a communication unit 324, and a display 325. A captured image acquired by the optical system 321 and the image sensor 322 includes blur caused by aberration or the like generated in the optical system 321. The captured image is transmitted to the image processing apparatus 303 via the communication unit 324. The image processing apparatus 303 includes a memory 331, a communication unit 332, an acquisition unit 333, a deblurring unit 334, and a calculation unit 335. The image processing apparatus 303 is configured to receive the captured image via the communication unit 332, to execute deblurring and suppression of overcorrection by a machine learning model, and to generate an estimated image. For the deblurring, a weight learnt in the learning apparatus 301 is used. Weight information is acquired in advance from the learning apparatus 301 and stored in the memory 331. This embodiment uses a CNN as a machine learning model, but can also be applied to other models.

Figure 11A:
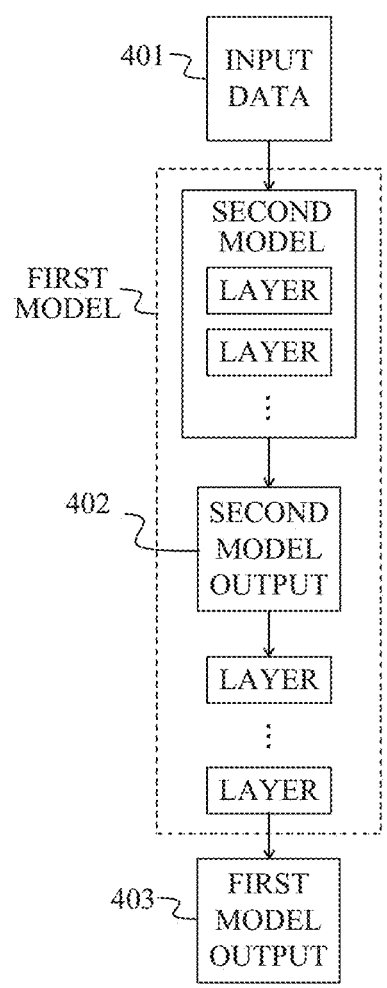
FIGS. 11A and 11B are configuration diagrams illustrating a machine learning model according to one or more aspects of the present disclosure.
Figure 11B:
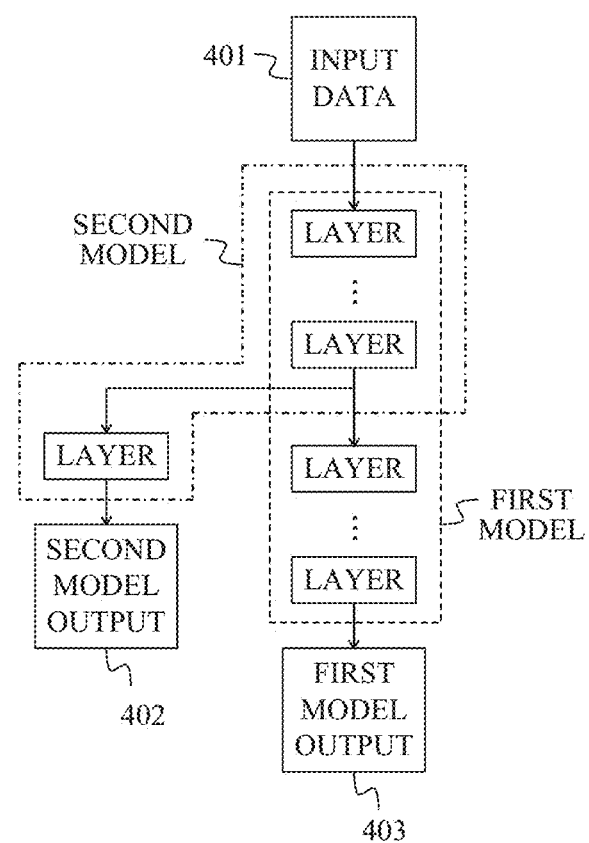

Next, a description will be given of the machine learning model in this embodiment with reference to FIGS. 11A and 11B. Each of FIGS. 11A and 11B is a configuration diagram illustrating the machine learning model in this embodiment. This embodiment uses a first machine learning model and a second machine learning model illustrated in FIG. 11A. From input data 401, the second machine learning model is configured to generate second model output 402, and the first machine learning model is configured to generate first model output 403. In the configuration of FIG. 11A, part of the first machine learning model is the same as the second machine learning model. However, as illustrated in FIG. 11B, a configuration may be used in which part of each of the first machine learning model and the second machine learning model is the same. In FIG. 11B, the second machine learning model has only one layer after branching, but the present disclosure is not limited to this. The details will be described later of the first machine learning model and the learning of the second machine learning model.

The second machine learning model is configured to perform deblurring based on a design value of the optical system 321, and to generate the second model output 402. When the blur of the optical system 321 is changed due to an effect of manufacturing variation or the like, accuracy of the deblurring is deteriorated. When the blur is larger than the design value, the second model output 402 is insufficiently corrected. On the contrary, when the blur is smaller than the design value, the second model output 402 is overcorrected. The insufficient correction results in an image with an intermediate resolution between the captured image and an image of an ideal object without blur, with blur smaller than the blur in the captured image, whereas the overcorrection results in an image including a structure that does not actually exist, such as undershoot. Thus, this embodiment is to suppress overcorrection caused by manufacturing variation or the like. The first machine learning model is configured to deblur the captured image, to suppress overcorrection, and to generate the first model output 403. The first machine learning model performs suppression of overcorrection in subsequent layers that are not common to the second machine learning model. However, it is not possible to accurately determine what has been overcorrected in an image. For example, when an edge is overcorrected, side effects such as undershoot and overshoot are caused by overcorection, and thus it is easy to determine overcorrection. However, when texture is overcorrected, side effects such as undershoot are unlikely to appear, and thus it is difficult to determine whether the texture is overcorrected or is originally strong texture component. Therefore, the first model output 403 includes mottled portion including areas in each of which the overcorrected texture is suppressed or not suppressed, and the resolution of the texture becomes discontinuous.

That is, in the second model output 402, the captured image is deblurred, but may be overcorrected due to the effect of the manufacturing variation or the like. In the first model output 403, the captured image is deblurred and the overcorrection of the edge is suppressed, but the resolution of the texture may be discontinuous. By combining the first and the second model output, the estimated image is generated in which the captured image is deblurred and the overcorrection of the edge and the discontinuity of the resolution of the texture are suppressed. The details thereof will be described later. When overcorrection occurs, the second model output 402 has a higher spatial frequency intensity than that in the first model output 403. On the other hand, when overcorrection does not occur, the second model output 402 has the spatial frequency intensity equivalent to that of the first model output 403. Hence, the second model output 402 has the spatial frequency intensity equal to or higher than that in the first model output 403. The estimated image is transmitted to the image pickup apparatus 302, stored in the memory 323, and displayed on the display 325.

Learning of weights in the first machine learning model and the second machine learning model is executed by the learning apparatus 301, as in that illustrated by the flowchart of FIG. 6. However, in this embodiment, the first machine learning model performs learning after the second machine learning model completes learning. Each step of FIG. 6 is executed by any of the memory 311, acquisition unit 312, calculation unit 313, or update unit 314 of the learning apparatus 301.

In step S101, the acquisition unit 312 acquires one or more pairs of input data and a ground truth image from the memory 311. A training image, that is a blur image, for the second machine learning model is generated by adding blur to the original image, the blur being calculated from the design value of the optical system 321. Optical parameters such as a focal length, F-number, in-focus distance, image height, and azimuth of the optical system 321 are determined, and the training image is generated with the blur corresponding to the optical parameters. The input data includes information on the optical parameters. The same procedure is repeated for each of the plurality of optical parameters to generate a plurality of pieces of input data corresponding to the various kinds of blur that occur in the optical system 321. Since the input data includes the information on the optical parameters, the machine learning model can distinguish the blur of the training image by using the optical parameters, and the blur can be corrected with high accuracy. For the ground truth image, the original image is used as it is, or to which blur smaller than the blur of the optical system 321 is added.

As a training image for the first machine learning model, an image is generated which includes blur different from the design value of the optical system 321 in addition to the image generated by the method of generating the training image for the second machine learning model. Learning is performed when the optical system 321 includes difference with the design value. The difference is caused by manufacturing variations, defocus when axial chromatic aberration or field curvature occurs, or the like. As the blur different from the design value, blur may be used of, for example, blur obtained by enlarging or reducing the blur calculated from the design value of the optical system 321. Deformation or rotation may also be used. There are further methods such as a method of using blur with different optical parameters, and methods of performing sharpening or blurring on blur. A ground truth image is the same as that of the second machine learning model, for the training image to which the blur that is substantially the same as the design value is added. Alternatively, the second model output 402 for the training image may be used as the ground truth image. As the ground truth image for the training image to which blur larger than the design value is added, the second model output 402 for the training image is used. That is, when the captured image includes larger blur than that of the design value, learning is performed so that insufficient correction is performed. The ground truth image is the same as that of the second machine learning model, for the training image with blur smaller than that of the design value. Alternatively, the ground truth image may be the second model output 402 for an image in which blur substantially the same as that of the design value is added to the same original image. With this pair of the training image and the ground truth image, it is possible to make the model learn so that only overcorrection is suppressed.

Subsequently, in step S102, the calculation unit 313 generates the first model output 403 or the second model output 402 from the input data 401 by using the first or the second machine learning model.

Subsequently, in step S103, the update unit 314 updates the weight for the first machine learning model or the second machine learning model based on an error between the first model output 403 or the second model output 402 and the ground truth image. When the first machine learning model perform learning, the weight for the same part as that of the already learnt second machine learning model is fixed and is not updated. That is, in that case, the weight for the second machine learning model is used as it is as the weight for the first machine learning model.

Subsequently, in step S104, the update unit 314 determines whether the learning has been completed. Learnt weight information is stored in the memory 311.

Figure 12:
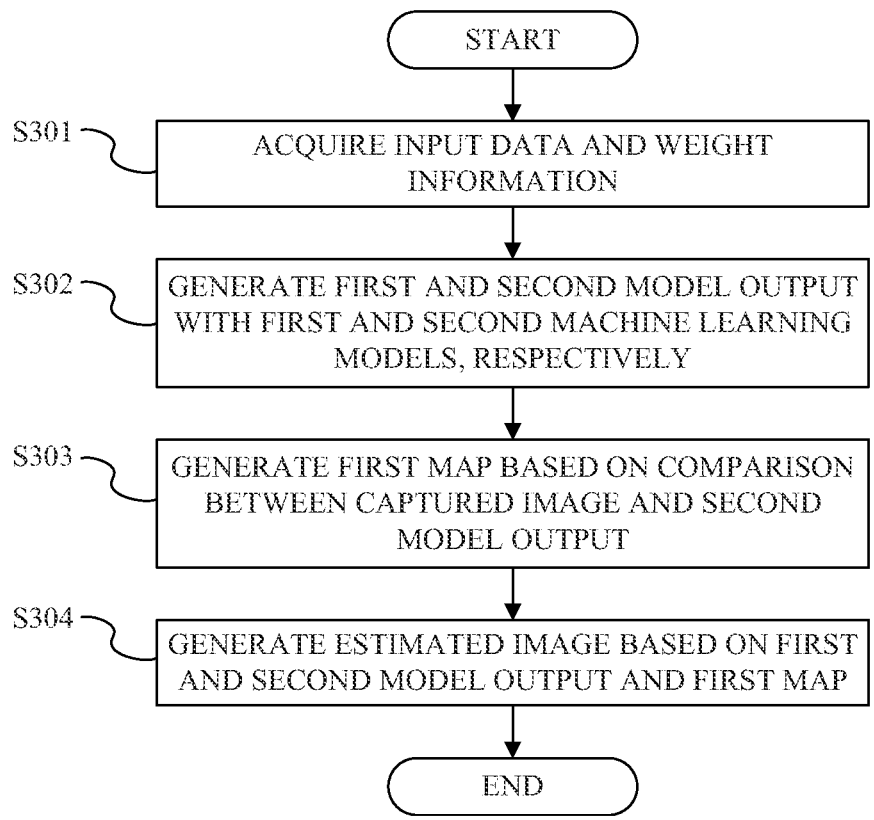
FIG. 12 is a flowchart illustrating generation of an estimated image according to one or more aspects of the present disclosure.

Next, with reference to FIG. 12, a description will be given of deblurring on the captured image and suppression of overcorrection each of which is executed by the image processing apparatus 303. FIG. 12 is a flowchart illustrating the generation of an estimated image in this embodiment.

First, in step S301, the acquisition unit 333 acquires the input data and the weight information of the first machine learning model and the second machine learning model. The input data includes the captured image and information on the optical parameters of the optical system 321 when the captured image is captured. In the case of the configuration of FIG. 11A, since the entire second machine learning model is included in the first machine learning model, only the weight information of the first machine learning model may be acquired.

Subsequently, in step S302, the deblurring unit 334 as an acquisition unit generates (acquires), from the input data, the first model output 403 and the second model output 402 in the first machine learning model and the second machine learning model, respectively. In the case of the configuration of FIG. 11A, since the entire second machine learning model is included in the first machine learning model, only the first machine learning model is executed, and the second model output 402 as intermediate output and the first model output 403 are generated.

Subsequently, in step S303, the calculation unit 335 generates a first map based on the comparison between the captured image and the second model output 402. This embodiment calculates the difference between the captured image and the second model output 402 and generates the first map indicating an area with a value larger than a predetermined threshold. The first map indicates an area with large correction residual and with the second value in the second model output 402, the area including the edge area where the overcorrection occurs. However, the area also includes an area where the correction residual is large but correction is properly performed.

Subsequently, in step S304, the calculation unit 335 as a generation unit generates the estimated image based on the first model output 403, the second model output 402, and the first map. In the second model output 402, the estimated image is generated by replacing, with the first model output 403, the area with a large correction residual which is indicated by the first map. By replacing, with the first model output 403, the area with a large correction residual only, the texture with a discontinuous resolution is not used for the estimated image. In the first model output 403, only the overcorrected edge is suppressed to be made to proper resolution, and the other edges have the same resolution as those in the second model output 402. Hence, only the overcorrection can be suppressed while a correction effect on the edge is not deteriorated.

As described above, according to this embodiment, it is possible to provide the image processing system which can suppress the side effect unique to the image estimation by the machine learning model.

Third Embodiment

Next, a description will be given of an image processing system in the third embodiment of the present disclosure. In this embodiment, converting bokeh of defocus blur including a saturated pixel is a purpose when an image is estimated by the machine learning model. The conversion of bokeh refers to processing that converts a distribution of defocus blur in an out-of-focus area of a captured image into a different distribution. For example, two-line blur caused by separation of PSF peaks is converted into circular blur with a flat distribution or into a Gaussian distribution function. Thereby, an in-focus object can be further sharpened, or impression of a captured image can be changed. The present disclosure can be also applied in the same manner to estimation on an image other than the conversion of bokeh, and can acquire an effect.

Figure 13:
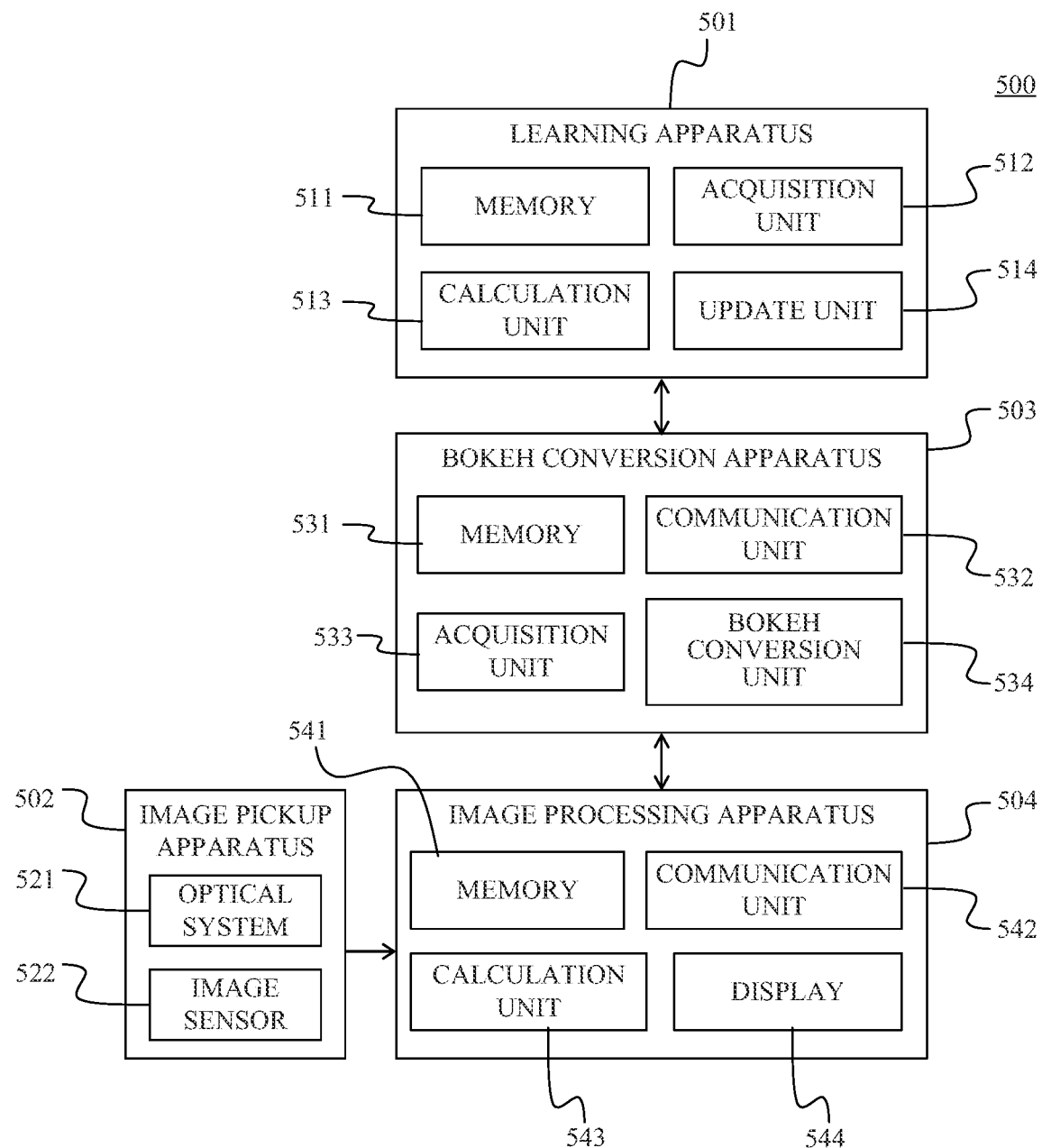
FIG. 13 is a block diagram illustrating an image processing system according to one or more aspects of the present disclosure.
Figure 14:
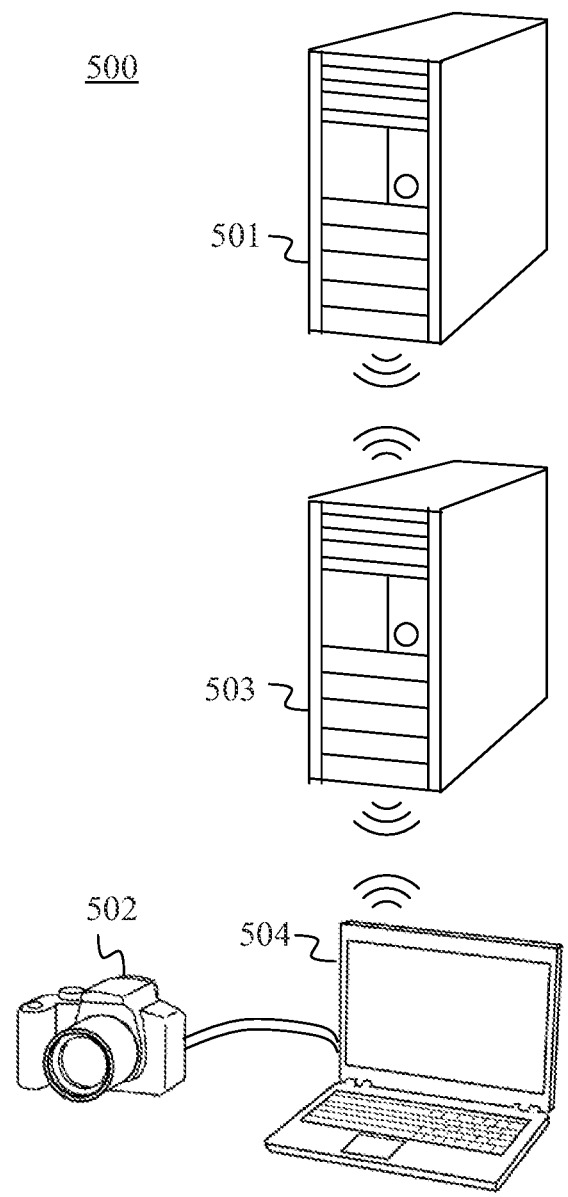
FIG. 14 is an external view illustrating the image processing system according to one or more aspects of the present disclosure.

FIG. 13 is a block diagram illustrating an image processing system 500 in this embodiment. FIG. 14 is an external view illustrating the image processing system 500. The image processing system 500 includes a learning apparatus 501, an image pickup apparatus 502, a bokeh conversion apparatus 503, and an image processing apparatus 504. Each apparatus is connected via a wired or wireless network.

The image pickup apparatus 502 includes an optical system 521 and an image sensor 522. A captured image includes defocus blur such as two-line blur generated in the optical system 521. The image processing apparatus 504 includes a memory 541, a communication unit 542, a calculation unit 543, and a display 544, and is configured to acquire the captured image from the image pickup apparatus 502 and to transmit the captured image to the bokeh conversion apparatus 503, according to user's input. The bokeh conversion apparatus 503 includes a memory 531, a communication unit 532, an acquisition unit 533, and a bokeh conversion unit 534, and is configured to convert bokeh of the captured image by using a first machine learning model and a second machine learning model. The bokeh conversion apparatus 503 is configured to acquire weight information of the first and second machine learning models from the learning apparatus 501 and to store it in the memory 531. The learning apparatus 501 includes a memory 511, an acquisition unit 512, a calculation unit 513, and an update unit 514, and is configured to learn weight for performing conversion of bokeh in the first machine learning model and the second machine learning model.

The image processing apparatus 504 is configured to acquire first model output and second model output that are acquired by converting bokeh in the first machine learning model and the second machine learning model, respectively, and to generate an estimated image with a suppressed side effect uniquely occurring in the machine learning model. The estimated image is displayed on the display 544, and the user can perform editing work such as correcting exposure while checking the displayed image. Although this embodiment uses CNNs for machine learning, the present disclosure can also be applied to other models.

The side effect uniquely occurring in the machine learning model in this embodiment is an artifact caused by a local increase or decrease in a signal that is not consistent with the actual object, as the artifact in the first embodiment. The change in the signal is caused as in the first embodiment. Saturation causes lack of information, and thus the machine learning model has to change processing for converting bokeh between an image with defocus blur including saturated pixels, that is an image with saturated bokeh, and an image with defocus blur only including non-saturated pixels, that is an image with non-saturated bokeh. However, the saturated bokeh and the non-saturated bokeh cannot be completely determined, and an artifact may occur.

The learning apparatus 501 is configured to execute learning of the weights by the first machine learning model and the second machine learning model as illustrated in the flowchart of FIG. 6. This embodiment has the same configuration as that illustrated in FIG. 11A. However, in this embodiment, the relationship between the first machine learning model and the second machine learning model is opposite to that of FIG. 11A. Further, as in the second embodiment, the configuration illustrated in FIG. 11B may be used, however, in this embodiment, the relationship between the first machine learning model and the second machine learning model is opposite to that of FIG. 11B. In this embodiment, the second machine learning model performs learning after the first machine learning model completes learning.

First, in step S101, the acquisition unit 512 acquires one or more pairs of input data and a ground truth image. The input data includes a training image. The method of generating the training image is the same as that of the first embodiment. However, the added blur is the defocus of the optical system 521. The defocus amount is determined, and corresponding defocus blur is added. Training images in an in-focus state where a defocus amount is 0 or in various defocus amounts are generated and used for learning. The ground truth image is generated by adding, to the original image, the defocus blur to be realized by the conversion. The conversion of bokeh does not restore a frequency component that has lost due to blur. Therefore, a spread of the defocus blur given to the ground truth image is equal to or larger than the defocus blur of the training image.

As in the first embodiment, the first machine learning model is configured to only convert non-saturated bokeh. The second machine learning model converts all bokeh, that is saturated bokeh and non-saturated bokeh, but may cause an artifact. In addition to the training image, the input data may include a parallax image having a viewpoint different from that of the training image. Parallax makes it easier for the machine learning model to distinguish between a non-in-focus object that is a target of the conversion and an in-focus object that is not the target, improving the accuracy of the conversion on bokeh. In this case, the parallax image is input in the same manner at the time of estimation. Instead of the parallax image, the input data may include a depth map or a defocus map.

Subsequently, in step S102, the calculation unit 513 generates model output from the input data by using the machine learning model. Subsequently, in step S103, the update unit 514 updates the weight for the machine learning model based on an error between the model output and the ground truth image. As in the second embodiment, when the second machine learning model perform learning, the weight for part common to the first machine learning model is fixed. Subsequently, in step S104, the update unit 514 determines completion of the learning. The learnt weight information is stored in the memory 511.

Here, the first machine learning model and the second machine learning model perform learning individually, but both learning can also be performed collectively. In this case, for one training image, two ground truth images are prepared for the first machine learning model and the second machine learning model, respectively. A loss function is assumed to be a weighted sum of an error between the first model output and the first ground truth image in which only non-saturated bokeh is different from the training image, and an error between the second model output and the second ground truth image in which all the bokeh are different from the training image. Thereby, the first machine learning model and the second machine learning model can be combined and learning can be collectively performed.

Figure 15:
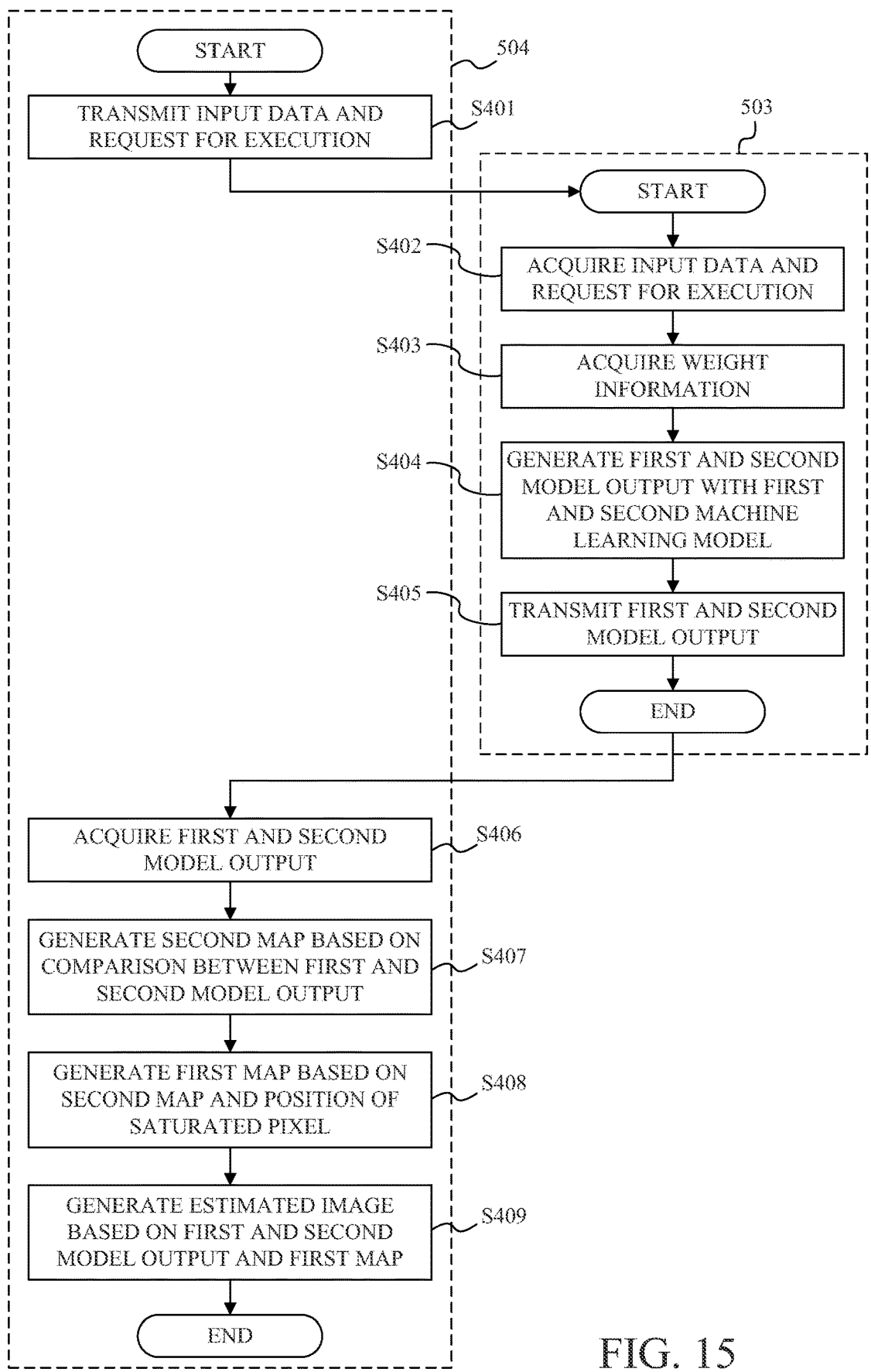
FIG. 15 is a flowchart illustrating generation of an estimated image according to one or more aspects of the present disclosure.

Next, with reference to FIG. 15, a description will be given of generation of an estimated image in which bokeh of the captured image is converted, executed by the image processing apparatus 504 and the bokeh conversion apparatus 503. FIG. 15 is a flowchart illustrating the generation of the estimated image in this embodiment.

First, in step S401, the communication unit 542 as a transmitting unit of the image processing apparatus 504 transmits input data including the captured image and a request for execution of bokeh conversion processing, to the bokeh conversion apparatus 503. The captured image is acquired in advance from the image pickup apparatus 502 and stored in the memory 541. When the input data at the time of learning includes information other than the training image, the same information is transmitted together with the captured image.

Subsequently, in step S402, the communication unit 532 as a receiving unit of the bokeh conversion apparatus 503 acquires (receives) the input data including the captured image and the request relating to the execution of processing each of which is transmitted from the image processing apparatus 504. Subsequently, in step S403, the acquisition unit 533 acquires weight information from the memory 531. Subsequently, in step S404, the bokeh conversion unit 534 as a first generation unit generates the first model output and the second model output from the input data by using the first machine learning model and the second machine learning model, respectively. The second model output is an image in which all bokeh are converted, but may include an artifact. The first model output is an image in which only non-saturated bokeh is converted, and does not include an artifact. Subsequently, in step S405, the communication unit 532 transmits the first model output and the second model output to the image processing apparatus 504.

Subsequently, in step S406, the communication unit 542 as an acquisition unit of the image processing apparatus 504 acquires the first model output and the second model output. Subsequently, in step S407, the calculation unit 543 generates a second map based on the comparison between the first model output and the second model output. In this embodiment, as in the first embodiment, the differences are binarized with a predetermined threshold to generate a second map.

Subsequently, in step S408, the calculation unit 543 generates a first map based on the second map and on a position of the saturated pixel in the captured image. In this embodiment, as in the first embodiment, the saturated bokeh includes a saturated pixel, and thus the first map is generated by extracting an artifact area that does not include the saturated pixel from the second map. In the first map, artifact is indicated as an area with a second value.

Subsequently, in step S409, the calculation unit 543 as a second generation unit generates an estimated image based on the first model output, the second model output, and the first map. In the second model output, the area with the artifact indicated by the first map is replaced with the first model output, and thereby the bokeh-converted estimated image without the artifact can be generated.

As described above, according to this embodiment, it is possible to provide the image processing system which can suppress a side effect unique when an image is estimated by a machine learning model.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to each embodiment, it is possible to provide an image processing method, an image processing apparatus, an image processing system, and a memory medium each of which can suppress a side effect uniquely occurs when an image is estimated by using a machine learning model.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2020-071279, filed on Apr. 10, 2020 which is hereby incorporated by reference herein in its entirety.

What is claimed is:

1. An image processing method comprising:

acquiring first model output generated based on a captured image by a first machine learning model;

acquiring second model output generated based on the captured image by a second machine learning model which is different from the first machine learning model; and generating an estimated image by using the first model output and the second model output, based on a comparison based on the second model output and one of the captured image and first model output, wherein the first machine learning model and the second machine learning model are models each of which is configured to estimate a correction component of blur in the captured image, wherein a blur correction effect on a high-luminance object of the first machine learning model is smaller than a blur correction effect on the high-luminance object of the second machine learning model.

2. An image processing method comprising:

acquiring first model output generated based on a captured image by a first machine learning model;

acquiring second model output generated based on the captured image by a second machine learning model which is different from the first machine learning model; and generating an estimated image by using the first model output and the second model output, based on a comparison based on the second model output and one of the captured image and first model output, wherein the first machine learning model and the second machine learning model are models each of which is configured to estimate a correction component of blur in the captured image, and to perform processing that is at least partly the same as processing performed by the other, wherein a blur correction effect on a high-luminance object of the first machine learning model is smaller than a blur correction effect on the high-luminance object of the second machine learning model.

* * * * *